United States Patent
Sharma et al.

(10) Patent No.: US 11,495,937 B1
(45) Date of Patent: Nov. 8, 2022

(54) TWO-PHOTON VISION DISPLAY

(71) Applicant: Meta Platforms Technologies, LLC, Menlo Park, CA (US)

(72) Inventors: Robin Sharma, Redmond, WA (US); Andrew John Ouderkirk, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 897 days.

(21) Appl. No.: 16/198,783

(22) Filed: Nov. 22, 2018

(51) Int. Cl.
| | | |
|---|---|---|
| *H01S 3/106* | (2006.01) | |
| *G02B 26/10* | (2006.01) | |
| *H01S 3/11* | (2006.01) | |
| *H01S 3/00* | (2006.01) | |
| *G02B 27/00* | (2006.01) | |
| *H01S 3/139* | (2006.01) | |
| *H01S 3/121* | (2006.01) | |
| *H01S 3/108* | (2006.01) | |
| *H01S 3/101* | (2006.01) | |
| *G02F 1/35* | (2006.01) | |
| *G02B 27/01* | (2006.01) | |
| *G02B 27/30* | (2006.01) | |
| *G02B 27/14* | (2006.01) | |

(52) U.S. Cl.
CPC .......... *H01S 3/1067* (2013.01); *G02B 26/103* (2013.01); *G02B 27/0093* (2013.01); *H01S 3/0085* (2013.01); *H01S 3/101* (2013.01); *H01S 3/108* (2013.01); *H01S 3/11* (2013.01); *H01S 3/121* (2013.01); *H01S 3/1398* (2013.01); *G02B 27/0172* (2013.01); *G02B 27/141* (2013.01); *G02B 27/30* (2013.01); *G02B 2027/0114* (2013.01); *G02F 1/3526* (2013.01)

(58) Field of Classification Search
CPC ...... H01S 3/1067; H01S 3/0085; H01S 3/101; H01S 3/108; H01S 3/11; H01S 3/121; H01S 3/1398; G02B 26/103; G02B 27/0093; G02B 27/0172; G02B 27/141; G02B 27/30; G02B 2027/0114; G02F 1/3526
See application file for complete search history.

(56) References Cited

U.S. PATENT DOCUMENTS 10,168,518 B2 * 1/2019 Amano .................. G02B 21/08

OTHER PUBLICATIONS

Palczewska, Grazyna, "Human infrared vision is triggered by two-photon chromosphore isomerization," PNAS, Dec. 1, 2014.
Artal, Pablo, "Visual acuity in two-photon infrared vision," Optica, Nov. 30, 2017, vol. 4, No. 12.
Bar-Noam, Adi Schejter et al., Correction-free remotely scanned two-photon in vivo mouse retinal imaging, Light: Science & Applications (2016) 5, e16007; doi 10.1038/lsa.2016.7 pp. 9.

* cited by examiner

*Primary Examiner* — David P Porta
*Assistant Examiner* — Meenakshi S Sahu
(74) *Attorney, Agent, or Firm* — Freestone Intellectual Property Law PLLC; Aaron J. Visbeek (57) ABSTRACT

Near-infrared pulses are emitted from a pulsed light source. A scanner directs the near-infrared pulses as scanned light. An optical element directs the scanned light into the eye. The scanned light is scanned in two dimensions to form an image on the eye. Photon-pairs of the near-infrared pulses deliver a photon energy that is perceived as visible light.

20 Claims, 9 Drawing Sheets

TWO-PHOTON VISION DISPLAY

TECHNICAL FIELD

This disclosure relates generally to optics, and in particular to displays.

BACKGROUND INFORMATION

Vision is initiated when light from the world is captured by the optics of the eye, focused at the retina by the cornea and lens and is eventually detected by photoreceptors. But, the first step in seeing occurs when photons in the visible spectrum are absorbed by photosensitive molecules in the outer segments of photoreceptors. Photoreceptors are of two types: cones and rods which contain photopigments which are sensitive to different wavelengths. Conventional display and imaging systems present images to a viewer by directing visible light to the eye.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus and process for presenting images with infrared pulsed light are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of an apparatus and process for presenting images with infrared pulsed light are described herein. Infrared light pulses from pulsed light sources (e.g. pulsed laser) may be perceived by the human eye when photon-pairs (closely tied in time) in the infrared light pulses can also stimulate the photopigments just like visible light. Studies indicate that these infrared photons-pairs incident on cones of the human eye are perceived as visible light having a color associated with approximately half the wavelength of the photons in the incident photon-pair. This phenomenon is attributed to an infrared photon-pair (at approximately twice the wavelength as the perceived visible light) having the energy level of one photon of the perceived wavelength of visible light. By way of example, a photon-pair of 950 nm wavelength light may be perceived as approximately 475 nm blue visible light. Furthermore, recent studies suggest that the perception of visible wavelengths scale non-linearly with the intensity of pulsed light sources due to the fact that two-photon vision is a non-linear phenomenon. In this disclosure, "two-photon" light will refer to the phenomenon of near-infrared light pulses being perceived as visible light to a human eye by virtue of "photon-pairs" in the near-infrared light pulses having similar photon energy as a photon of the perceived wavelength of visible light.

Human eyes have also been shown to demonstrate a second phenomenon where non-pulsed infrared light (e.g. infrared light from a continuous wave laser) that may be considered "non-visible" light, is perceived (with enough intensity) as red light. For example, light having a wavelength of 950 nm may be perceived as red light by the human eye. This may be due to the sensitivity of the L cone-opsins being lower in the infrared region and decreasing logarithmically as a function of wavelength, while nevertheless having a sensitivity to wavelengths between 750 nm and 950 nm that is non-zero.

Utilizing one or both of the above phenomenon, near-infrared pulsed light sources can deliver the perception of red/green/blue (RGB) light, or other colors of visible light, to a human eye using pulsed near-infrared light (e.g. 750 nm to 1400 nm). Hence, displays using the near-infrared pulsed light sources are also able to deliver images to the retina using near-infrared pulses.

Using the near-infrared photon-pairs may reduce ghost image perceived by the human eye because any reflections of the pulsed light by the retina within the human eye are unlikely to include photon-pairs that generate perceived visible light to non-targeted regions of the retina, thereby reducing perceived ghost images and other undesirable optical effects associated with inter-eye reflections. In the context of a head mounted display (HMD), an optical combiner directs display light to an eye of a wearer in addition to passing scene light from an external environment to the eye. When a two-photon display provides the display light to a wearer of the HMD, the combiner can be completely transparent to visible scene light while only reflecting infrared light such as the near-infrared wavelengths of the two-photon light. These and other embodiments are described in more detail below associated with the descriptions of FIGS. 1-8.

Figure 1:
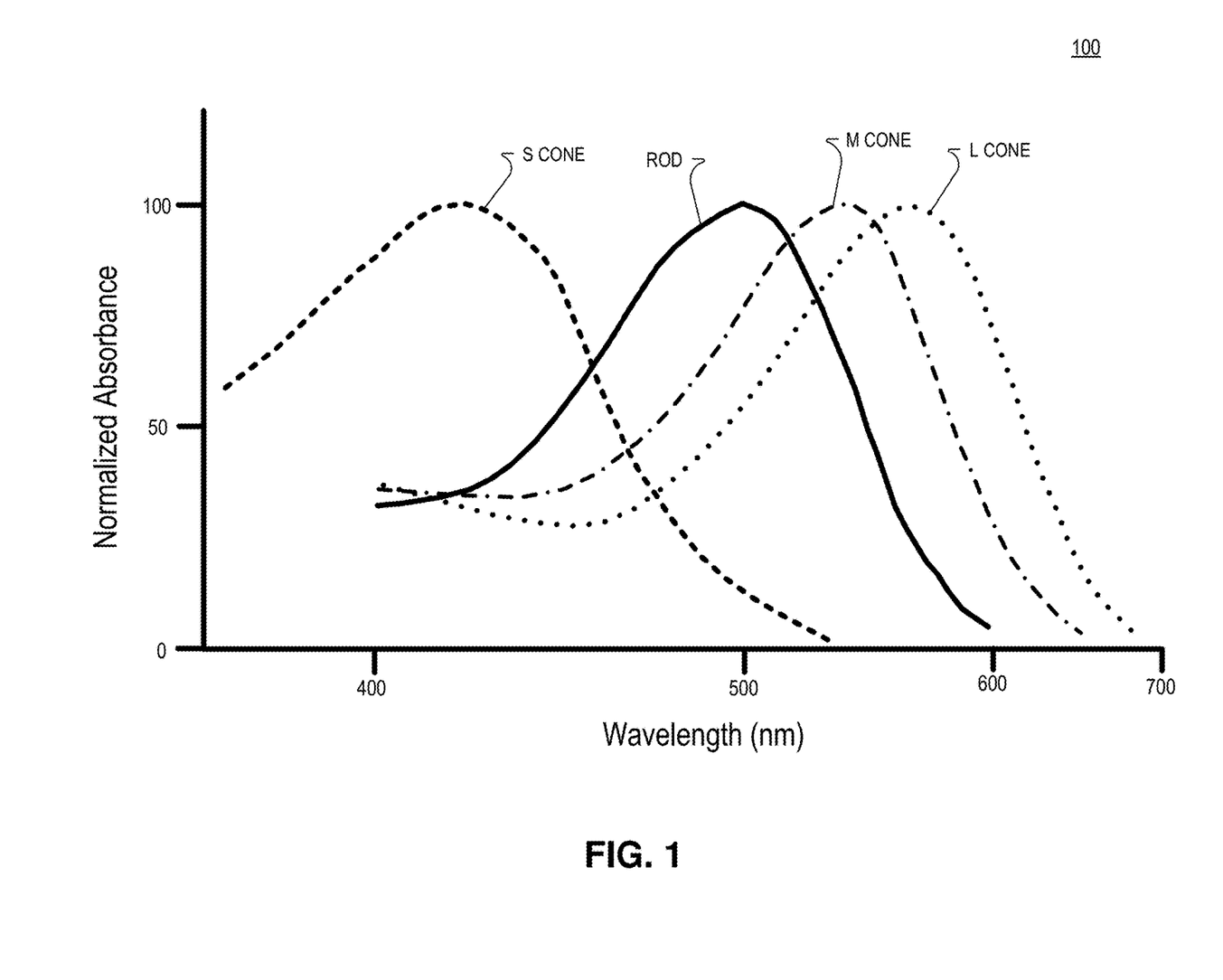
FIG. 1 illustrates the spectral sensitivity curves for rods and cones of the human eye.

FIG. 1 illustrates the spectral sensitivity curves for rods and cones of the human eye. Graph 100 plots the normalized absorbance (y-axis) with respect to received light wavelength in nanometers (x-axis) for a rod and S, M, and L cone of the human eye. The peak sensitivity of the rod may be 498 nm. The peak sensitivity of the S, M, and L cones are 420 nm, 534 nm, and 564 nm, respectively. S cones are more sensitive to blue light, M cones are more sensitive to green light, and L cones are more sensitive to red light. Any photopigment molecule is comprised of an opsin and a chromophore. The chromophore determines the wavelength sensitivity of the molecule.

Perception of color is governed by a complicated neural circuitry that spans the retina and the brain. Color sensitive cone photoreceptors are the first level of the network of neurons that determine color perception. A single cone photoreceptor can also sometimes induce the perception of color. A clump or collection of photoreceptors located at a particular retinal location may also collectively feed into a neural circuit in the inner retina which eventually determines color perception.

While the visible spectrum is usually considered to be from 400 nm to 750 nm, wavelengths longer than 750 nm can also be detected by the human eye.

Figure 2:
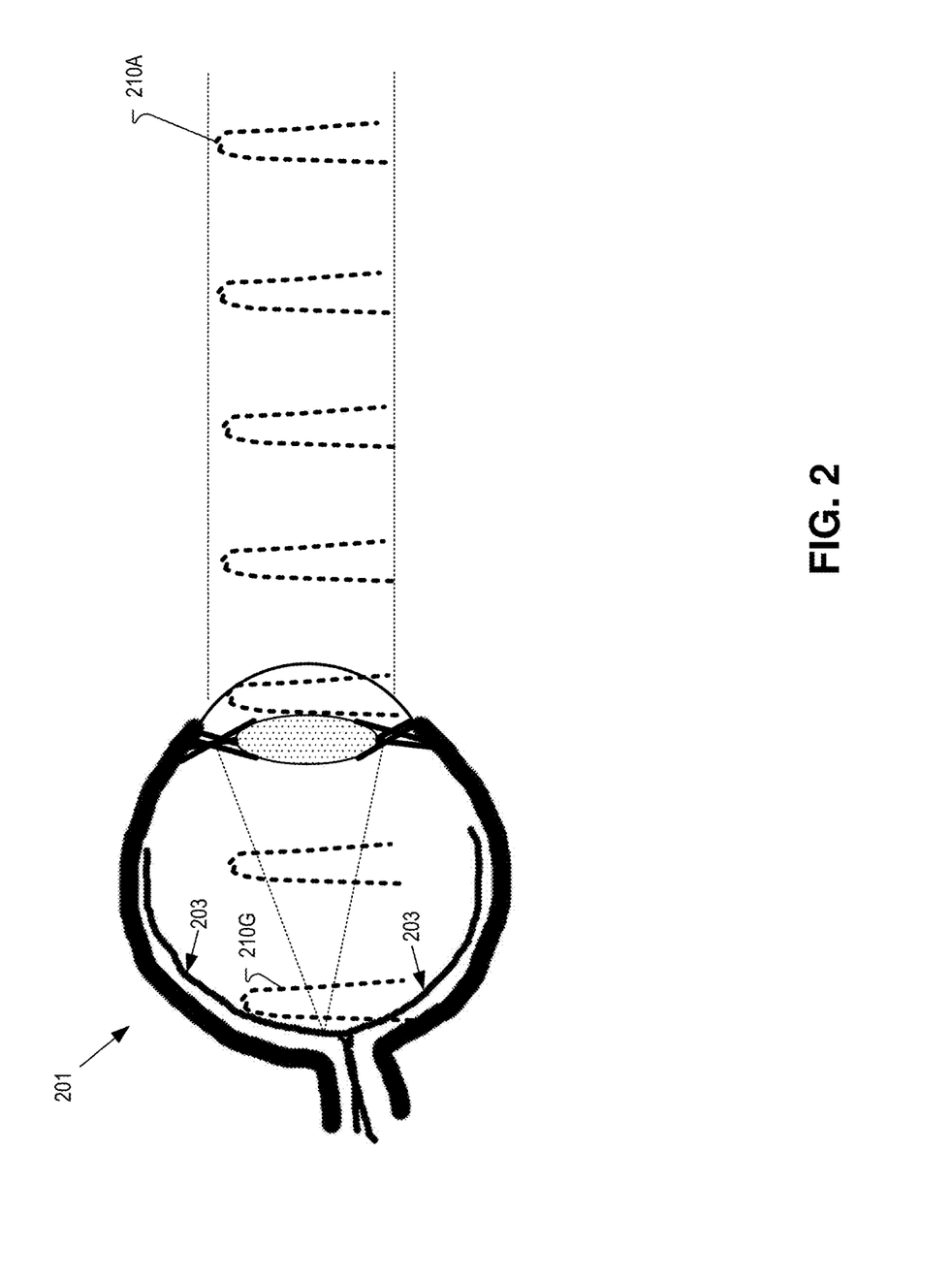
FIG. 2 illustrates a train of near-infrared pulses propagating toward an eye, in accordance with an embodiment of the disclosure.

FIG. 2 illustrates a train of near-infrared pulses 210 propagating toward an eye 201, in accordance with embodiments of the disclosure. When light is focused at the retina, all the energy in the near-infrared pulse is collapsed in space and time. This increases the probability that two of the photons in the near-infrared pulse will be absorbed simultaneously as a photon-pair by photopigments in the retina 203, thus resulting in the perception of visible colors. In FIG. 2, pulses 210A-210G may be a near-infrared wavelength such as 1100 nm and perceived by eye 201 as green light having a wavelength of approximately 550 nm.

Near-infrared pulses are generated from an infrared pulsed light source. It is understood that "pulsed light" or "near-infrared pulse(s)" generated by a pulsed light source have very high optical energy. "Pulsed light" having the necessary optical energy to generate the necessary photon-pairs described in this disclosure may require a particular laser architecture such as a Q-switching laser or mode-locked laser. In other words, simply modulating a mechanical aperture placed in front of a continuous wave laser may not generated "pulsed light" with high enough optical energy to generate the photon-pairs described in this disclosure. Near-infrared pulses 210 may have a pulse width on the order of nanoseconds, tens of picosecond, or even femtoseconds. Pulsed light sources may emit pulses having a pulse width shorter than 250 nanoseconds, at a frequency greater than 1 MHz, and having an energy greater than 1 pico Joules (pJ) per pulse.

For the purposes of this disclosure, photon-pairs refer to two photons having an infrared wavelength and being spaced closely enough in time and space such that the photon-pair delivers an energy level to a cone of the eye that causes a perception that the photon-pair is a single photon of visible light that is approximately half the wavelength of the photons in the photon-pair. For example, a photon-pair of photons having a wavelength of 950 nm may become incident on a cone of an eye and cause the cone to perceive the photon-pair as one photon of 475 nm blue light because the energy levels of a photon-pair at 950 nm and a single photon of 475 nm blue light are similar. Infrared photon-pairs and their corresponding perception as visible light by the eye may also be referred to as two-photon light in this disclosure. A single photon having a wavelength in the visible range incident on a cone of a retina and causing the retina to perceive that single photon as visible light may be referred to as one-photon light for purposes of this disclosure. Conventional light sources and displays, of course, use one-photon light to present images to viewers. In order for two infrared photons to be considered a photon-pair or two-photon light, the two photons have to be spaced close enough together in time and space to become incident on the same cone of a retina. Additionally, both photons in the photon-pair may have to be incident on that same cone of the retina within a very short time period. This time period may be on the order of pico seconds, femto second (i.e. $10^{-15}$ seconds) or atto seconds (i.e. $10^{-18}$ seconds).

Figure 3:
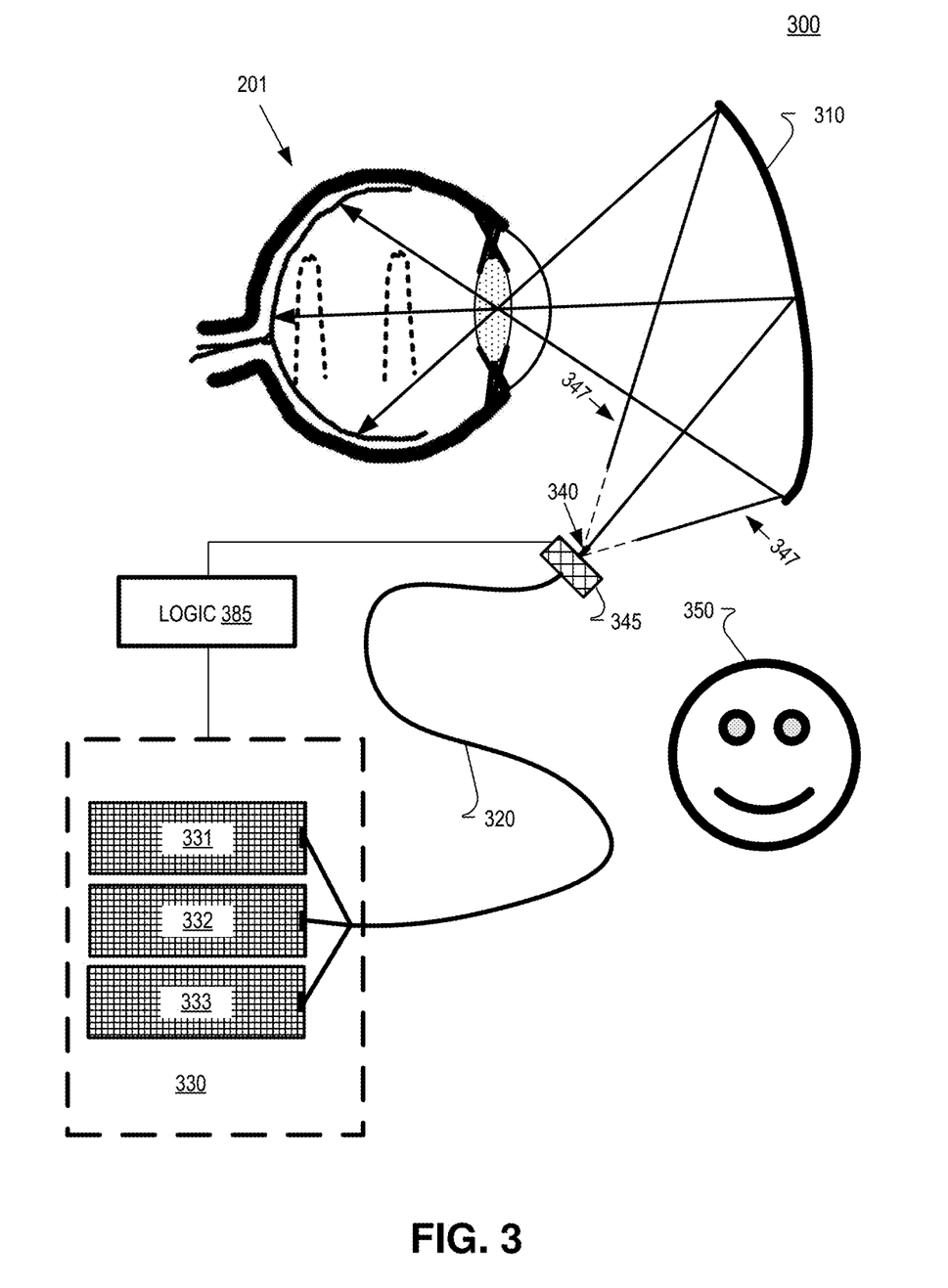
FIG. 3 illustrates an example diagram of a two-photon display, in accordance with an embodiment of the disclosure.

FIG. 3 illustrates an example diagram of a two-photon display 300, in accordance with embodiments of the disclosure. Display 300 includes an infrared pulsed light source 330, an optical fiber 320 having a fiber tip 340, a scanner 345, an optical element 310, and image logic 385. Light source 330 includes pulsed light sources 331, 332, and 333 and the pulses light sources may be pulsed lasers. Optical fiber 320 is coupled to receive near-infrared pulses from each of the pulsed lasers 331, 332, and 333. Optical element 310 may be a near-eye optical element configured to reflect or diffract scanned light received from scanner 345 in eye 201.

Photon-pairs of the near-infrared pulses emitted by pulsed light source 331 may be perceived as red light by the eye 201, near-infrared pulses emitted by pulsed light source 332 may be perceived as green light by the eye 201, and photon-pairs of the near-infrared pulses emitted by pulsed light source 333 may be perceived as blue light by the eye. Pulsed light source 331 may have a wavelength of approximately 1300 nm so that photon-pairs in the pulses will be perceived as red light having a wavelength around 650 nm. Pulsed light source 332 may have a wavelength of approximately 1100 nm so that photon-pairs in the pulses will be perceived as green light having a wavelength around 550 nm. Pulsed light source 333 may have a wavelength of approximately 950 nm so that photon-pairs in the pulses will be perceived as blue light having a wavelength around 475 nm. The infrared pulses emitted by the light sources may have a pulse width shorter than 250 nanoseconds at a frequency greater than 1 kHz.

In FIG. 3, optical element 310 is illustrated as an optical combiner and eye 201 is gazing through the optical combiner 310. Combiner 310 may include dichroic mirrors configured to reflect an infrared wavelength of the near-infrared pulses and pass visible light wavelengths. Combiner 310 may include an optically transparent layer made from glass or optical grade plastic. The optically transparent layer may be coated with a dielectric dichroic coating that transmits visible light and reflects near-infrared light. In one embodiment, combiner 310 includes a diffraction grating or a volume hologram that diffracts infrared light but does not diffract visible wavelengths.

Near-infrared pulses from infrared pulsed light source 330 are coupled into an optical fiber 320. The optical fiber 320 is being scanned in two dimensions by a scanner 345 to generate scanned light 347. The scanners described in the disclosure may include microelectromechanical systems (MEMS) based scanners, fiber-optic scanners, piezo actuator scanners, resonant or linear scanners, bi-resonant scanners, and/or acousto-optic deflectors. Scanner 345 may be disposed in a plane that is conjugate to a pupil plane of eye 201.

Near-infrared pulses emitted by the fiber tip 340 are reflected by the combiner 310 into the eye 201. The pulse train of near-infrared pulses propagating through optical fiber 320 is focused by the optics of the eye onto the retina to create a perception of visible wavelengths. Pulsed lasers 331, 332, and 333 may each emit near-infrared pulses having different wavelengths. Image logic 385 is configured to drive pulsed light sources 331, 332, and 333 and configured to modulate the scanner 345 to scan the near-infrared pulses on a pixel-by-pixel basis to different two-dimensional positions on combiner 310 that are reflected to two-dimensional positions on the retina of eye 201. By modulating the intensity of each laser very rapidly in concert with the modulation of scanner 345, an image or a pattern 350 will be visible to the user. The intensity of light emitted by pulsed light sources 331, 332, or 333 may be modulated by image logic 385 at a rate in excess of 100 kHz. The modulation may be performed by acousto-optic modulators, electro-optic modulators, Application-specific integrated circuits (ASIC), and/or Field Programmable Gate Arrays (FPGAs). The perceived color of "pixels" in pattern 350 may be modulated by changing the pulse width of the near-infrared pulse or the intensity of the pulsed light source emitting the near-infrared pulse. Image logic 385 may also receive images to inform the driving of scanner 345.

Figure 4:
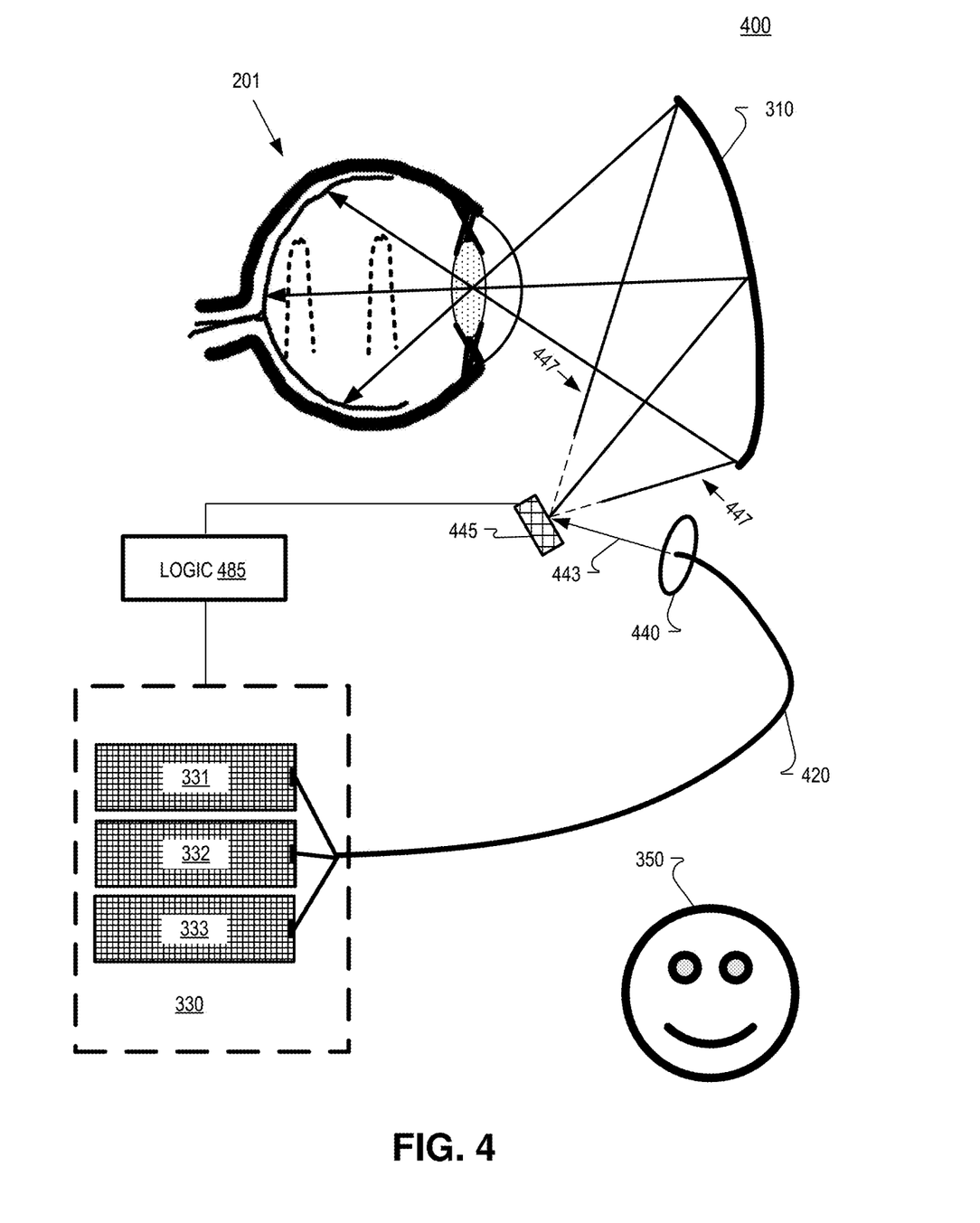
FIG. 4 illustrates another example diagram of a two-photon display, in accordance with an embodiment of the disclosure.

FIG. 4 illustrates another example diagram of a two-photon display 400, in accordance with embodiments of the disclosure. Light from near-infrared pulsed light source 330 is coupled into an optical fiber 420. Light emitted by optical fiber 420 is collimated by a collimating lens 440. The collimated light 443 propagates towards a two-dimensional reflective scanner 445 that spreads light across the clear aperture of the combiner 310. Light reflects or diffracts from the combiner 310 into the eye 201. The pulse train of near-infrared pulses is focused by the optics of the eye onto the retina to create a perception of visible wavelengths. Image logic 485 is configured to drive lasers 331, 332, and 333 and configured to modulate the two-dimensional reflective scanner 445 to scan the near-infrared pulses as scanned light 447 on a pixel-by-pixel basis to different two-dimensional positions on combiner 310 that are reflected to two dimensional positions on the retina of eye 201. By modulating the intensity of each laser very rapidly in concert with the modulation of two-dimensional reflective scanner 445, an image or a pattern 350 will be visible to the user. Image logic 485 may also receive images to inform the driving of scanner 445.

Figure 5:
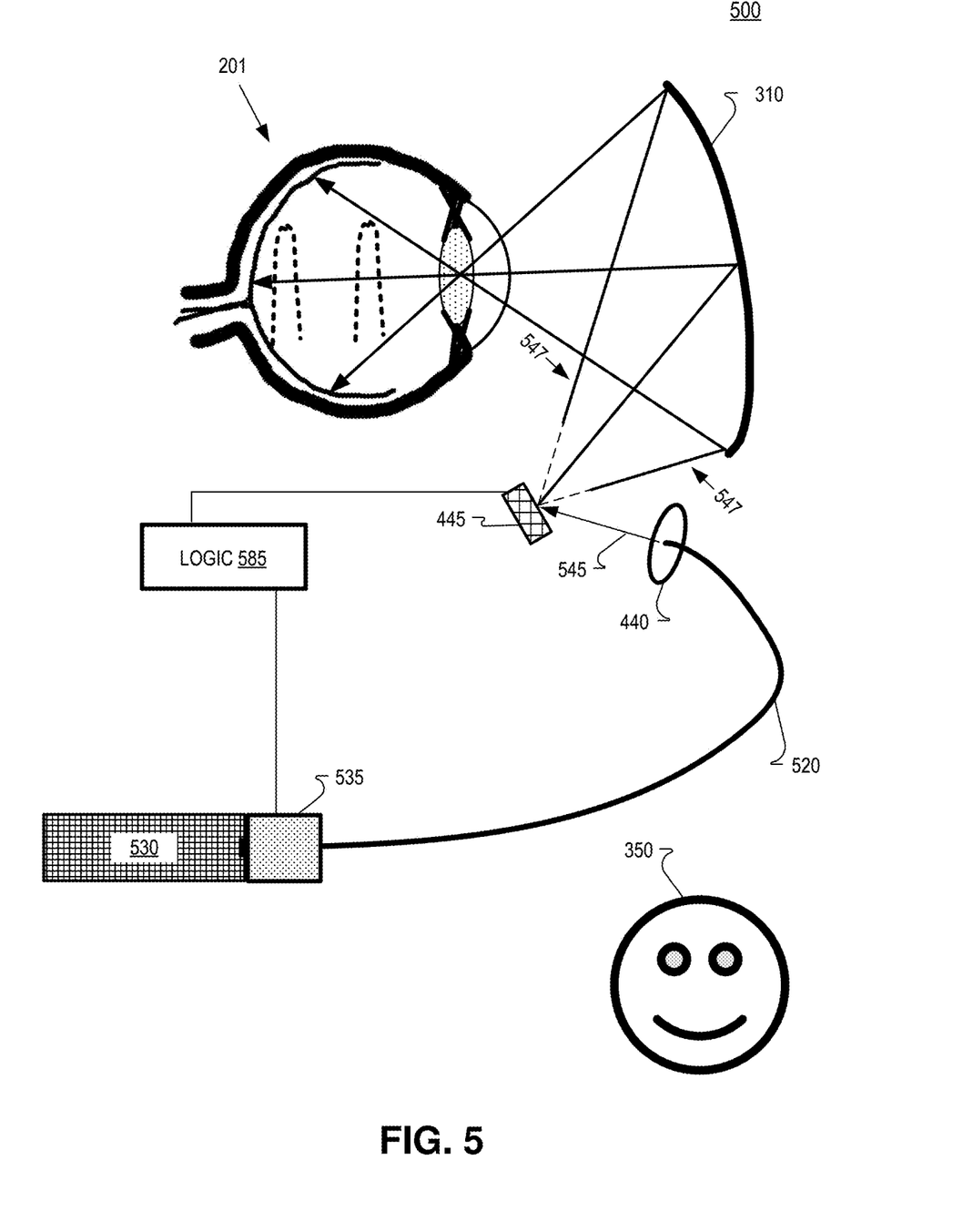
FIG. 5 illustrates an example diagram of a two-photon display that includes a swept laser source, in accordance with an embodiment of the disclosure.

FIG. 5 illustrates an example diagram of a two-photon display 500 that includes a swept laser source 530, in accordance with embodiments of the disclosure. Light from swept laser source 530 is coupled into an optical fiber 520. Light emitted by optical fiber 520 is collimated by a collimating lens 440. The collimated light 545 propagates towards a two-dimensional reflective scanner 445 that spreads light across the clear aperture of the combiner 310 as scanned light. Light reflects or diffracts from the combiner 310 into the eye 201. The pulse train of near-infrared pulses is focused by the optics of the eye onto the retina to create a perception of visible wavelengths.

For swept laser source 530, the central wavelength of the emitted light from swept laser source 530 is modulated rapidly by a modulator 535 that changes the current driving the swept laser source 530 or a cavity length of swept laser source 530. Image logic 585 is configured to drive modulator 535 and thereby change the wavelength of near-infrared pulses emitted into optical fiber 520. Image logic 585 is also configured to modulate the two-dimensional reflective scanner 445 to scan the near-infrared pulses on a pixel-by-pixel basis to different two-dimensional positions on combiner 310 that are reflected to two-dimensional positions on the retina of eye 201. By modulating the wavelength of the near-infrared pulses in concert with the modulation of two-dimensional reflective scanner 445, an image or a pattern 350 may be presented to a user. Image logic 585 may also receive images to inform the driving of scanner 445. The rate at which the center wavelength of the swept source laser 530 is changed may be above 100 kHz. Swept laser source 530 may change wavelengths from 950-1300 nm in order to generate near-infrared pulses that are perceived as red, green, and blue light.

Figure 6A:
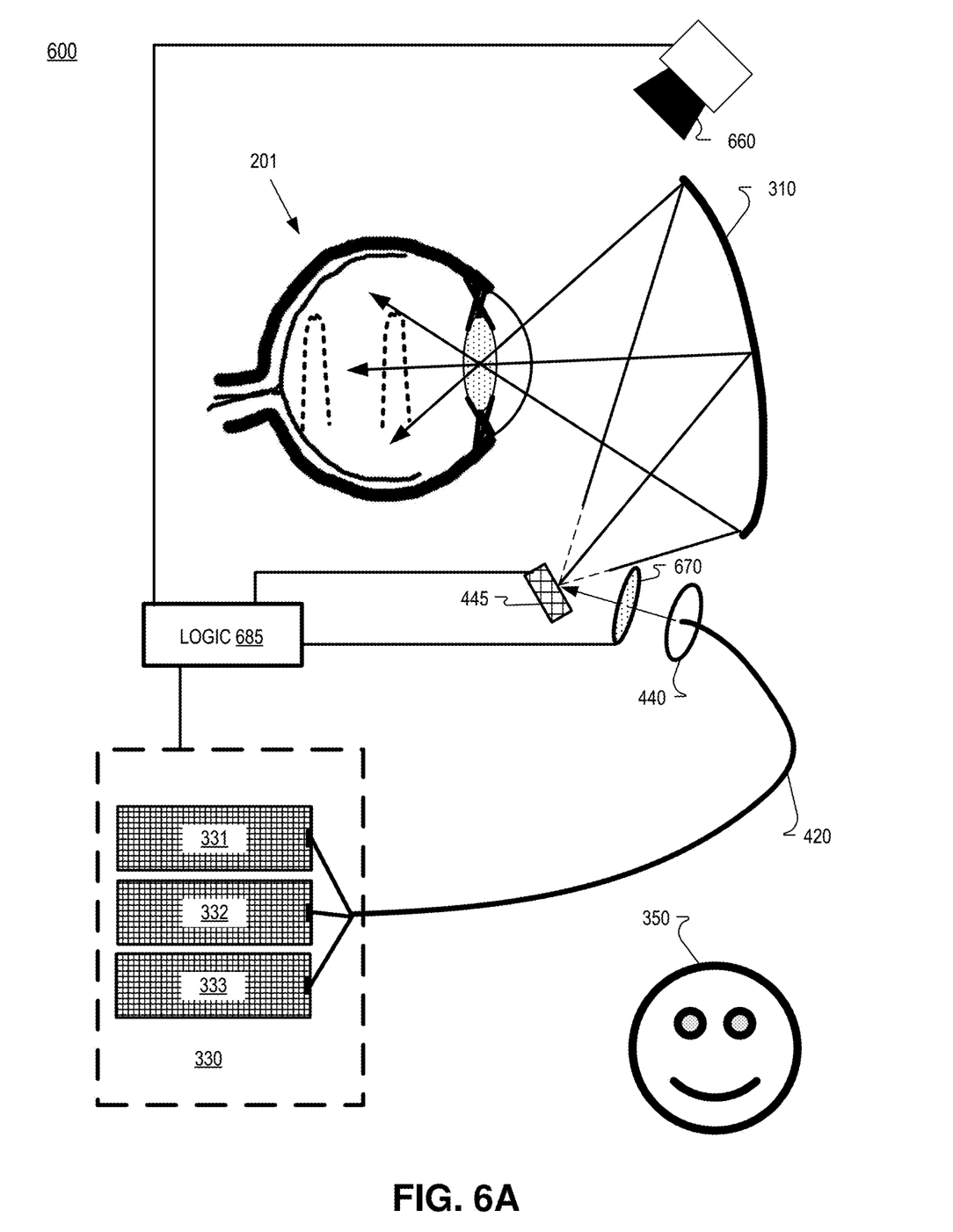
FIG. 6A illustrates two-photon light focused shallower than the retina of an eye, in accordance with an embodiment of the disclosure.
Figure 6B:
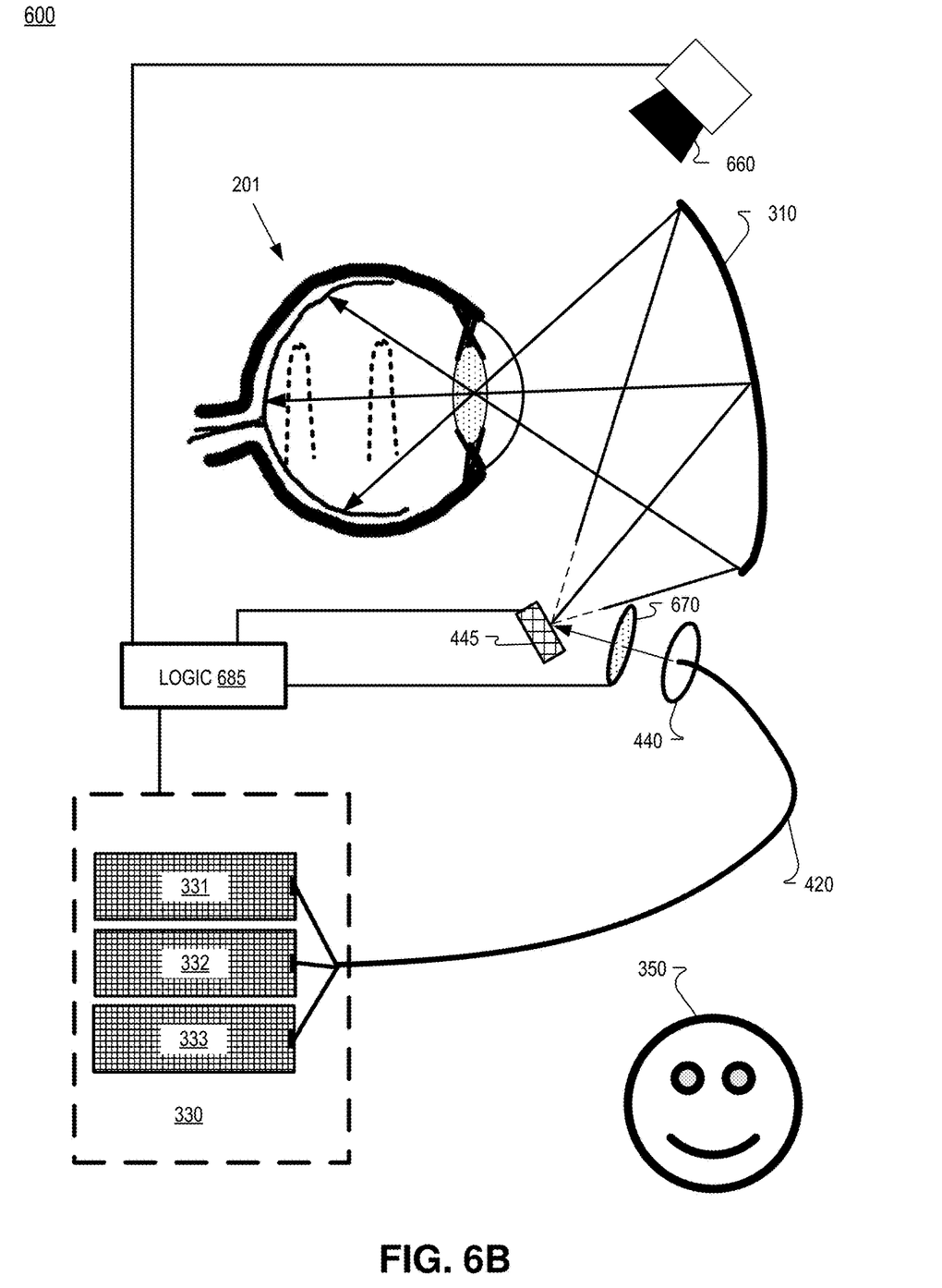
FIG. 6B illustrates two-photon light focused on the retina of an eye, in accordance with an embodiment of the disclosure.

FIGS. 6A and 6B illustrate an example layout of a two-photon display 600 with an eye-tracker 660 and an accommodation element 670, in accordance with embodiments of the disclosure. Two-photon display 600 includes near-infrared pulsed light source 330, optical fiber 420, collimating lens 440, accommodation element 670, two-dimensional reflective scanner 445, optical combiner 310, eye-tracking camera 660, and image logic 685. Eye-tracker 660 may include a camera capturing images of the eye 201 at video rates (e.g. 60 or 120 frames per second). With calibration and image processing algorithms, eye-trackers currently available today can determine the location of the pupil and the cornea and can estimate the gaze vector for the eye 201.

Accommodation element 670 is depicted to be transmissive, such as a liquid lens, but it could also be a reflective accommodation element such as a deformable mirror, for example. The accommodation element 670 may be modulated by image logic 685 to achieve image frame rates of 30 frames per second or greater.

In FIG. 6A, when the user is accommodating to a near-plane, collimated light from the two-photon display source will not be focused at the retina, but will be focused shallower than the retina, as illustrated by the rays reflecting off of combiner 310 don't focus on the retina of eye 201. Consequently, two-photon absorption efficiency will be lower and the image projected by the display 550 will be dim or imperceptible.

In FIG. 6B, eye-tracker 660 is used to determine the plane that the eyes are accommodating at. Consequently, the phase imparted by the accommodation element 670 is modulated to change the curvature of the wavefront. This assist the near-infrared light being focused at the retina for a large field of view. As a result, the two-photon absorption efficiency is higher and the image presented to the user is bright and discernable.

Figure 7:
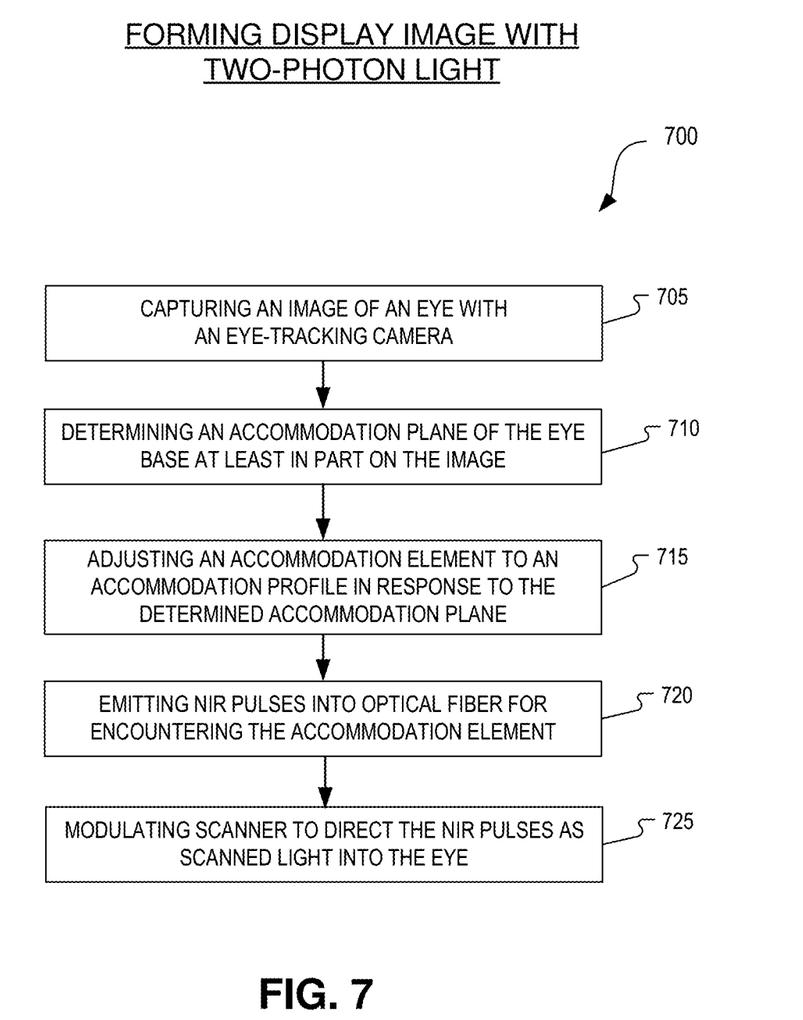
FIG. 7 illustrates an example process of forming a display image with two-photon light, in accordance with an embodiment of the disclosure.

FIG. 7 illustrates an example process 700 of forming a display image with two-photon light, in accordance with embodiments of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel. Process 700 may be performed by image logic 685, for example In process block 705, an image of an eye is captured by an eye-tracking camera. The eye-tracking camera may be included in a head mounted display (HMD), in some embodiments.

In process block 710, an accommodation plane of the eye is determined based at least in part on the image captured by the eye-tracking camera. In some embodiments, process 700 further includes capturing a second image of a second eye and determining the accommodation plane of the eye is also based at least in part on the second image. An image of each eye may be used to determine a gaze position of the eyes and an accommodative plane can be inferred from the gaze position, for example.

In process block 715, an accommodation element (e.g. 670) is adjusted to an accommodation profile in response to the determined accommodation plane. The accommodation profile may include different phase values to be imparted to different near-infrared pulses at different times and/or space. The accommodation element is disposed between a scanner and an output of an optical fiber. In one embodiment, adjusting the accommodation element changes a phase of the near-infrared pulses propagating through the accommodation element to focus the near-infrared pulses on the retina of the eye. Since the optics (e.g. the lens) of the eye changes depending on the accommodation plane of the eye, the changing optics of the eyes can be accounted for in order to focus the near-infrared pulses on the retina.

In process block 720, near-infrared pulses are emitted into the optical fiber (e.g. 420) for encountering the accommodation element. The near-infrared pulses are emitted by a pulsed light source and photon-pairs of the near-infrared pulses deliver a photon energy to the eye that is perceived as visible light.

In process block 725, the scanner is modulated to direct the near-infrared pulses as scanned light into the eye. In one embodiment, modulating the scanner is performed while the accommodation element is adjusted to the accommodation profile. The scanned light may be scanned in two dimensions to form the display image on the retina on the eye.

Figure 8:
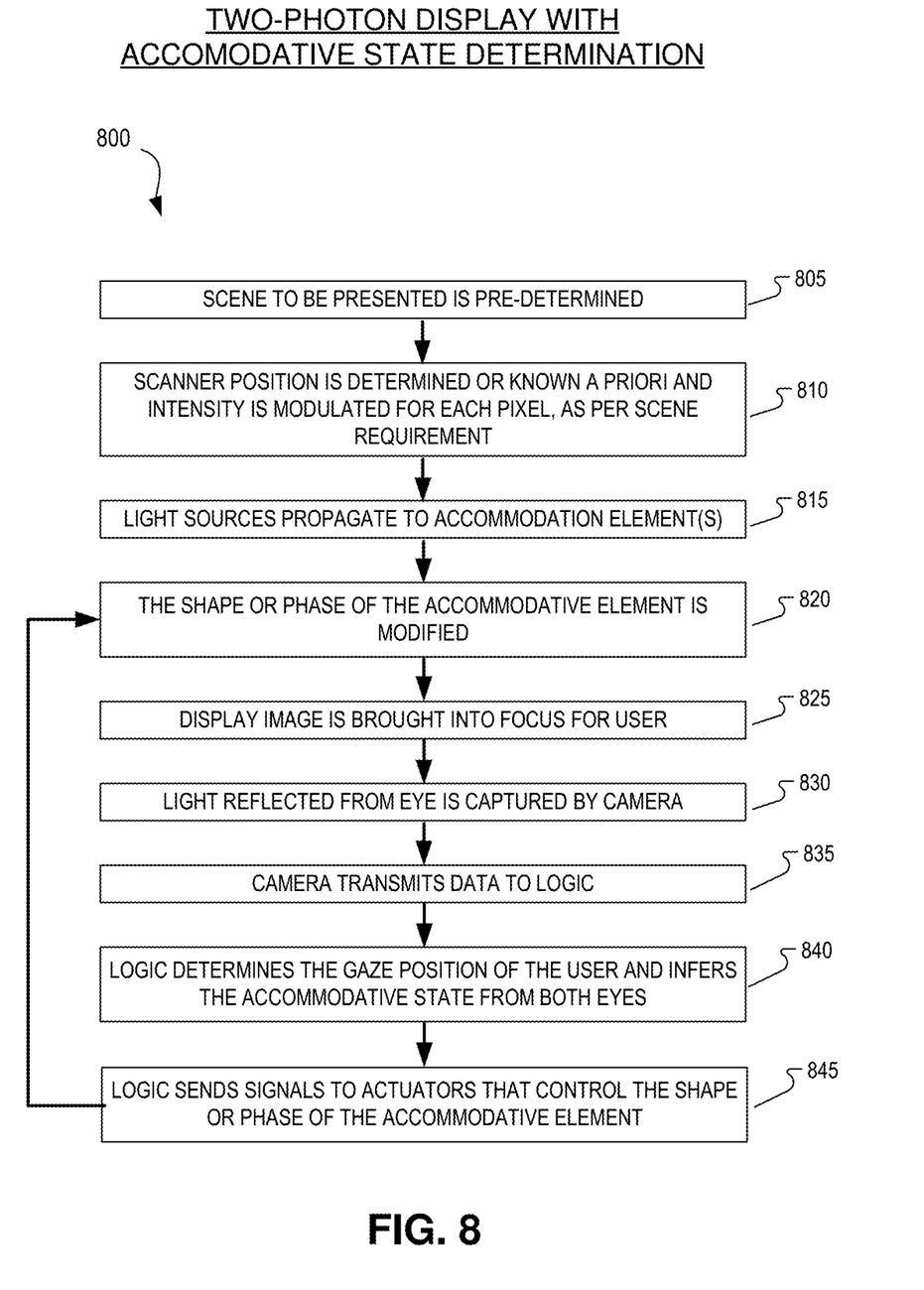
FIG. 8 illustrates another example process of forming a display image with two-photon light, in accordance with an embodiment of the disclosure.

FIG. 8 illustrates another example process 800 of forming a display image with two-photon light, in accordance with embodiments of the disclosure. The order in which some or all of the process blocks appear in process 800 should not be deemed limiting. Rather, one of ordinary skill in the art having the benefit of the present disclosure will understand that some of the process blocks may be executed in a variety of orders not illustrated, or even in parallel. Process 800 may be performed by image logic 685, for example In process block 805, a scene or pattern (e.g. 350) to be presented is pre-determined. In process block 810, a scanner position is determined or known a priori and intensity is modulated for each pixel, as required by the scene or pattern to be presented. In process block 815, near-infrared pulses propagate to an accommodation element (e.g. 670).

In process block 820, the shape or phase of the accommodative element is modified and in process block 825, the display image is brought into focus for the user. Light reflected from the eye is captured by an eye-tracking camera in process block 830. In process block 835, the eye-tracking camera transmits data from the image to logic (e.g. logic 685). The logic determines the gaze position of the user and infers the accommodative state from both eyes, in process block 840.

In process block 845, the logic sends signals to the actuators that control the shape or phase of the accommodative element to drive an accommodation profile on the accommodative element that will focus the near-infrared pulses on to the retina. Subsequent to executing process block 845, process 800 may return to process block 820.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "logic" or "image logic" (e.g. 385/485/585/685) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Network may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A two-photon display comprising:
   a pulsed light source configured to emit near-infrared pulses;
   an optical element configured to direct scanned light into an eye; and
   a scanner configured to direct the near-infrared pulses as scanned light, wherein the scanned light is scanned in two dimensions to form an image on the eye, and wherein photon-pairs of the near-infrared pulses deliver a photon energy to the eye that is perceived as visible light.

2. The two-photon display of claim 1 further comprising:
   a second pulsed light source configured to emit second near-infrared pulses; and
   a third pulsed light source configured to emit third near-infrared pulses, wherein the photon-pairs of the near-infrared pulses are perceived as red light by the eye, photon-pairs of the second near-infrared pulses are perceived as green light by the eye, and photon-pairs of the third near-infrared pulses are perceived as blue light by the eye,
   and wherein the scanner is also configured to direct the second near-infrared pulses and third near-infrared pulses as the scanned light.

3. The two-photon display of claim 1, wherein the pulse light source is a swept-source laser, the two-photon display further comprising:
   a modulator configured to adjust a central wavelength of the near-infrared pulses by adjusting a current of the swept-source laser or by modifying a cavity length of the swept-source laser.

4. The two-photon display of claim 1 further comprising:
   an optical fiber configured to bring the near-infrared pulses from the pulsed light source to the scanner, wherein the scanner includes a piezo actuator configured to steer a fiber tip of the optical fiber to form the image.

5. The two-photon display of claim 1 further comprising:
   an optical fiber configured to bring the near-infrared pulses from the pulsed light source to the scanner, wherein the scanner includes a reflective element positioned to receive the near-infrared pulses and selectively redirect the near-infrared pulses to the optical element to form the image.

6. The two-photon display of claim 5 further comprising:
   a collimating lens coupled between the scanner and an output of the optical fiber, wherein the collimating lens is configured to collimate the near-infrared pulses emitted by the output of the optical fiber.

7. The two-photon display of claim 1, wherein the optical element is a near-eye optical element configured to reflect or diffract the scanned light received from the scanner into the eye.

8. The two-photon display of claim 7, wherein the optical element includes a combiner including dichroic mirrors configured to reflect an infrared wavelength of the near-infrared pulses and pass visible light wavelengths.

9. The two-photon display of claim 1 further comprising:
   an optical fiber configured to bring the near-infrared pulses from the pulsed light source to the scanner;
   a camera configured to image the eye; and
   an accommodation element disposed between the scanner and an output of the optical fiber, wherein the accommodation element is configured to modulate a curvature of a wavefront of the near-infrared pulses in response to an accommodation factor derived from images captured by the camera.

10. The two-photon display of claim 9, wherein the accommodation element is transmissive.

11. The two-photon display of claim 9, wherein the accommodation element is reflective.

12. The two-photon display of claim 1, wherein a pulse width of the near-infrared pulses is shorter than 250 nanoseconds at a frequency greater than 1 kilohertz.

13. A method of forming a display image with two-photon light, the method comprising:
   capturing an image of an eye with an eye-tracking camera;
   determining an accommodation plane of the eye based at least in part on the image;
   adjusting an accommodation element to an accommodation profile in response to the determined accommodation plane, wherein the accommodation element is disposed between a scanner and an output of an optical fiber;
   emitting near-infrared pulses into the optical fiber for encountering the accommodation element, wherein the near-infrared pulses are emitted from a pulsed light source, and wherein photon-pairs of the near-infrared pulses deliver a photon energy to the eye that is perceived as visible light; and
   modulating the scanner to direct the near-infrared pulses as scanned light into the eye.

14. The method of claim 13, wherein modulating the scanner is performed while the accommodation element is adjusted to the accommodation profile, and wherein the scanned light is scanned in two dimensions to form the display image on a retina of the eye.

15. The method of claim 13, wherein adjusting the accommodation element changes a phase of the near-infrared pulses to focus the near-infrared pulses on a retina of the eye.

16. The method of claim 13, wherein the accommodation element includes a deformable mirror or reflective spatial light modulator (SLM).

17. The method of claim 13, wherein the eye-tracking camera is included in a head mounted display (HMD).

18. The method of claim 13 further comprising:
capturing a second image of a second eye, wherein determining the accommodation plane of the eye is also based at least in part on the second image.

19. The method of claim 13, wherein first photon-pairs of the near-infrared pulses are perceived as red light by the eye, second photon-pairs of the near-infrared pulses are perceived as green light by the eye, and third photon-pairs of the near-infrared pulses are perceived as blue light by the eye.

20. The method of claim 13, wherein a pulse width of the near-infrared pulses is shorter than 250 nanoseconds at a frequency greater than 1 kHz.

* * * * *